(12) United States Patent  
Lee et al.

(10) Patent No.: US 9,110,858 B2  
(45) Date of Patent: Aug. 18, 2015

(54) APPARATUS AND METHOD FOR CONTROLLING MEMORY IN MOBILE COMMUNICATION SYSTEM

(71) Applicants: Samsung Electronics Co. Ltd., Suwon-si, Gyeonggi-do (KR); POSTECH ACADEMY INDUSTRY FOUNDATION, Pohang-si, Gyeongsangbuk-do (KR)

(72) Inventors: Kang-Min Lee, Suwon-si (KR); Sung-Joo Yoo, Pohang-si (KR)

(73) Assignees: Samsung Electronics Co., Ltd., Suwon-si (KR); Postech Academy Industry Foundation, Pohang-si (KR)

( * ) Notice: Subject to any disclaimer, the term of this patent is extended or adjusted under 35 U.S.C. 154(b) by 130 days.

(21) Appl. No.: 13/915,008

(22) Filed: Jun. 11, 2013

(65) Prior Publication Data

US 2014/0250345 A1  Sep. 4, 2014

(30) Foreign Application Priority Data

Mar. 4, 2013  (KR) .......................... 10-2013-0022732

(51) Int. Cl.
*G06F 11/16*  (2006.01)

(52) U.S. Cl.
CPC ............. *G06F 11/1666* (2013.01); *Y02B 60/50* (2013.01)

(58) Field of Classification Search
CPC .................................................. G06F 11/1076
USPC ............ 714/763, 702, 718, 754, 768, 785, 16
See application file for complete search history.

(56) References Cited

U.S. PATENT DOCUMENTS

| | | | |
|---|---|---|---|
| 7,447,950 B2* | 11/2008 | Takahashi et al. | ............ 714/702 |
| 7,647,536 B2 | 1/2010 | Dempsey et al. | |
| 2004/0237022 A1 | 11/2004 | Karpuszka et al. | |
| 2005/0036371 A1 | 2/2005 | Kushida | |
| 2007/0283217 A1 | 12/2007 | Gorfajn et al. | |
| 2010/0011278 A1* | 1/2010 | Bernstein et al. | ............. 714/785 |
| 2010/0185897 A1* | 7/2010 | Abts et al. | ........................ 714/16 |
| 2010/0241930 A1 | 9/2010 | Chang et al. | |
| 2010/0277979 A1 | 11/2010 | Kang et al. | |

OTHER PUBLICATIONS

J. Abella, et al., "Low Vccmin Fault-Tolerant Cache with Highly Predictable Performance," Proc. MICRO, pp. 111-121, Dec. 12-16, 2009.

* cited by examiner

*Primary Examiner* — Fritz Alphonse
(74) *Attorney, Agent, or Firm* — Jefferson IP Law, LLP

(57) ABSTRACT

An apparatus and method for controlling a low-voltage memory in a mobile communication system are provided. The apparatus includes a memory for storing data including at least one error caused by a low-voltage, and an error correction unit for identifying whether the at least one error exists in the memory according to a first bit set in a local buffer of an error correction code storage, for comparing location information on the error data read from the memory and location information on error data of at least one protection set in the local buffer of the error correction code storage when it is determined that the at least one error exists in the memory, for generating an error correction code as a result of the comparison, and for correcting the error data of the memory according to the error correction code.

24 Claims, 8 Drawing Sheets

APPARATUS AND METHOD FOR CONTROLLING MEMORY IN MOBILE COMMUNICATION SYSTEM

PRIORITY

This application claims the benefit under 35 U.S.C. §119 (a) of a Korean patent application filed on Mar. 4, 2013 in the Korean Intellectual Property Office and assigned Serial No. 10-2013-0022732, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) SAMSUNG ELECTRONICS CO., LTD., and 2) POSTECH ACADEMY INDUSTRY FOUNDATION.

BACKGROUND OF THE INVENTION

1. Field of the Invention

The present invention relates to a mobile communication system. More particularly, the present invention relates to an apparatus and method for controlling a low-voltage memory in a mobile communication system.

2. Description of the Related Art

In a mobile communication system, all digital chips include a logic part and a memory part therein. Generally, a Static Random Access Memory (SRAM) cell type memory is used as a memory for the digital chip.

Errors which may be generated in the memory can be classified into three types as described below, which can be addressed as follows.

Hard Error: a hard error refers to an error wherein a certain bit cell is permanently damaged due to a defect generated during semiconductor manufacturing processes so that it cannot be written to and/or read from. An error bit location (hereinafter, referred to as an error location) is determined in the manufacturing processes, and cannot be changed after the manufacturing processes have been completed. Therefore, a memory cell repair technique has been widely used to reroute the error location to a prepared spare cell when the error location is identified after the manufacturing processes are completed. All contact to a word line including bits with an identified error is achieved by transferring an address to a prepared spare word line. Transfer of the address is programmed through an eFuse in a facility where the chip is manufactured. Since corresponding word lines can be wholly replaced according to this method even when only one error is generated, a redundancy bit may be wasted. Further, only errors which are previously found in the manufacturing processes can be repaired, while it is impossible to repair errors (soft error, aging, etc.) which are generated after the completion of the manufacturing processes.

Soft Error: α-particles which come from beyond the Earth or are generated on the Earth have a small size and a high energy level. Accordingly, the α-particles can delete values stored in memory cells in a case of colliding against internal physical components of a memory. This is called a soft error. The soft error can be generated any time, and a prediction of soft error generation is impossible. However, the memory can be recycled by writing values on the bit cells again since the bit cell is not physically broken by the soft error. In order to correct the soft error, Error Correction Codes (ECC) (for example parity) are respectively stored to correspond to each data of the memory. Then, the error correction is performed by reading both the corresponding error code and the data at each memory access time to identify whether errors are generated. A general cache controller provides the EEC technique for the soft error. In a soft error correction scheme, many redundancy bits are required to store the EEC for all memory words. Further, since the errors are processed through software by a Central Processing Unit (CPU) when the errors are generated, a performance penalty is increased. In a case that the errors are processed by hardware, hardware complexity is determined depending on how many bit errors in a word line can be processed. Generally, the error correction scheme can support a 1 bit error correction or a 2 bit error detection because it is impossible to perform an error correction for the 2 bit error.

FIG. 1 is a graph showing an error frequency due to a voltage according to the related art.

Low-Voltage Error: In the case of a memory, as shown in FIG. 1, a failure frequency in a writing operation increases as a voltage of an electric power source is lowered. In a digital circuit design of the related art, chips are designed to operate at a high-voltage of the electric power source, in which writing failure is not generated at all. The opportunity to reduce the electric power of the chips is thus greatly restricted by the memory requirements. This failure is defined as an error caused by a low-voltage condition (a low-voltage error). The probability of persistent low-voltage error is in inverse proportion to a log-scale for voltage, and an error rate increases as the voltage is lowered.

The aforementioned memory cell repair technique and soft error ECC technique have problems as described below.

(1) Problems of the memory cell repair technique:

An error location relating to a low-voltage error can be identified when processes are completed. Therefore, it is possible to apply a cell repair technique using eFuse. However, to implement the cell repair technique, an area for the added eFuse and for a redundancy word line used for changing the entire word line is greatly increased. Further, since the number of the corresponding spare word lines linearly increases as the number of errors increases, it is difficult to predict the number of the spare word lines in advance. Accordingly, there is a necessity for preparation of sufficiently large redundancy cells and eFuse, resulting in the increase of cost for securing the area.

(2) Problem of the soft error ECC technique:

A soft error ECC technique of the related art will be described. Basically, since the soft error ECC technique is prepared for a case of failing to identify an error location previously, error codes for all error regions must be stored. Further, the detection of errors is carried out by an added hardware/software logic, but the error correction is transferred to an exception handler so as to be processed by a software. It is determined that a performance penalty due to a software error frequency is lowered when the software error frequency is very low. Accordingly, there are problems as follows when the soft error ECC technique is applied to correct the 'low-voltage error'.

Firstly, since the 'low-voltage error' is permanent under the corresponding voltage of the electric power source, errors are always generated in the case of contact with a corresponding address. Accordingly, it is determined that the error frequency greatly increases (in the case of soft errors, the error frequency can be significantly decreased because the errors disappear when a rewriting operation is performed again). However, there is still a problem in that the performance penalty greatly increases when the errors are corrected by software.

Secondly, it is necessary to carry out an ECC detection process for all writing contact and an ECC generation process for all reading contact. Since an error location of a 'low-voltage error' is previously determined, it is necessary to perform a corresponding process for contact with a word line where an error is generated. However, the related art does not classify these processes. Accordingly, there is still a problem in that the performance penalty increases even at a time of contact with an area having no error.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for solving a problem of memory errors caused by a voltage of an electric power source being at or below a level at which errors are generated, in order to increase the efficiency of electric power in a mobile communication system.

Another aspect of the present invention is to provide an apparatus and method for minimizing an area cost for configuring a memory, and a performance penalty in a mobile communication system, resulting in an improvement of electric power and improved performance of the mobile communication system.

Another aspect of the present invention is to provide an apparatus and method for reducing overhead resources used by using a small parity when a memory is configured in a mobile communication system In accordance with an aspect of the present invention, an apparatus for controlling a memory in a mobile communication system is provided. The apparatus includes the memory for storing data including at least one error caused by a low-voltage, and an error correction unit for identifying whether the at least one error exists in the memory according to a first bit set in a local buffer of an error correction code storage, for comparing location information on the error data read from the memory and location information on error data of at least one protection set in the local buffer of the error correction code storage when it is determined that the at least one error exists in the memory, for generating an error correction code as a result of the comparison, and for correcting the error data of the memory according to the error correction code.

In accordance with another aspect of the present invention, a method of controlling a memory in a mobile communication system is provided. The method includes identifying whether information of at least one error caused by a low-voltage exists in the memory for storing error data according to a first bit set in a local buffer of an error correction code storage, comparing location information on the error data read from the memory and location information on error data of at least one protection set in the local buffer of the error correction code storage, and generating an error correction code as a result of the comparison and correcting the error data of the memory according to the error correction code.

According to yet another aspect of the present invention, an apparatus for controlling a memory in a mobile communication system is provided. The apparatus includes a memory in which error data caused by a low-voltage is stored, an error correction code storage for storing at least one protection set corresponding to a row address to be recorded when a signal is input, a controller for identifying whether at least one error exists in the memory according to a first bit stored in a local buffer of the error correction code storage, for comparing a column address which is read from the memory and has the error with an ID bit of the at least one protection set if it is determined that the at least one error exists in the memory, and for generating an error correction code as a result of the comparison, and an error correction unit for correcting the error data of the memory according to the error correction code.

According to still another aspect of the present invention, a method of controlling a memory in a mobile communication system is provided. The method includes storing at least one protection set, which corresponds to a row address to be recorded, in an error correction code storage, when a signal is input, identifying whether information of at least one error data caused by a low-voltage exists in the memory, according to a first bit stored in a local buffer of the error correction code storage, comparing a column address which is read from the memory and has an error with an ID bit of at least one protection set if the at least one error exists in the memory, generating an error correction code as a result of the comparison, and correcting the error data of the memory according to the error correction code.

Aspects of the present invention improve an efficiency of electric power of a memory used in a mobile communication system, while reducing a cost of an added area and a performance penalty in the mobile communication system.

Aspects of the present invention reduce a consumption of electric power in the mobile communication system.

Aspects of the present invention track and update an error location even when the error location is changed.

Aspects of the present invention effectively correct an error even though error data of an access unit is configured with 2 bits.

Aspects of the present invention reduce overhead resources used by using a small parity.

Aspects of the present invention process all multi-bit errors generated in a memory row.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
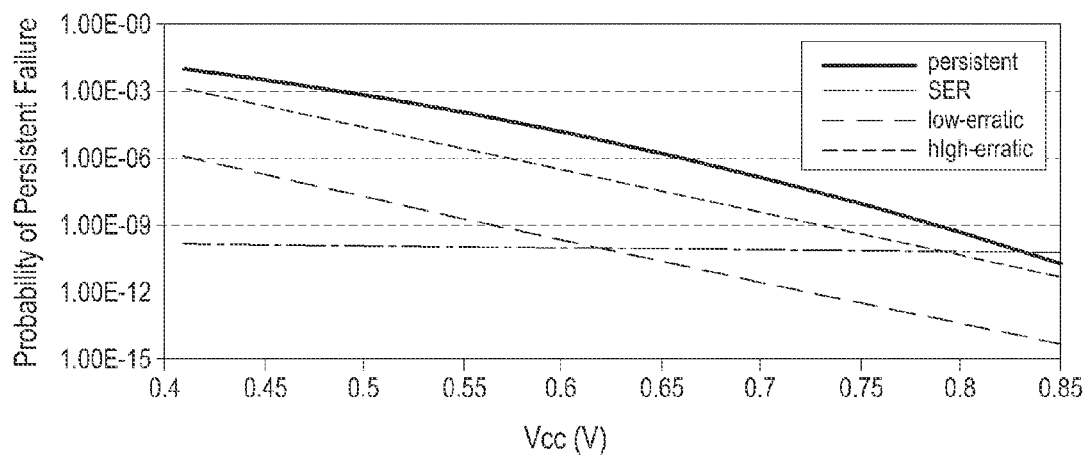
FIG. 1 is a graph showing an error frequency due to a voltage according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention exhibit a method of effectively processing a low-voltage error and lowering a voltage of an electric power source to a minimum. Generally, a location of the low-voltage error will have been previously identified when manufacturing processes are completed, and does not change even after the passing of time. Further, even if the error location changes, it is possible to track and update the error location.

Also, exemplary embodiments of the present invention provide an apparatus and method for minimizing a cost and a performance deterioration which are caused by operations of processing memory bit errors which may be generated when a voltage of an electric power source is lowered to the minimum in a mobile communication system including a chip having a memory.

Particularly, in all digital chips using a memory, when a voltage of an electric power source is reduced up to a minimum in order to lower electric power, a small amount of bit errors are generated. To detect and correct the bit errors, the exemplary embodiments of the present invention provide a separate memory and stores both an error location and an error correction code, which correspond to each word line of the memory, in the separate memory. The exemplary embodiments of the present invention provide an apparatus and method for correcting the bit error using the corresponding code at a time of reading and/or writing a word with the corresponding error. Exemplary embodiments of the present invention provide a method of enabling the corresponding mobile communication system to operate without an error using a lower voltage than that of an existing electric power source, so as to minimize the consumption of electric power in a chip and to reduce an added area for the chip.

Figure 2:
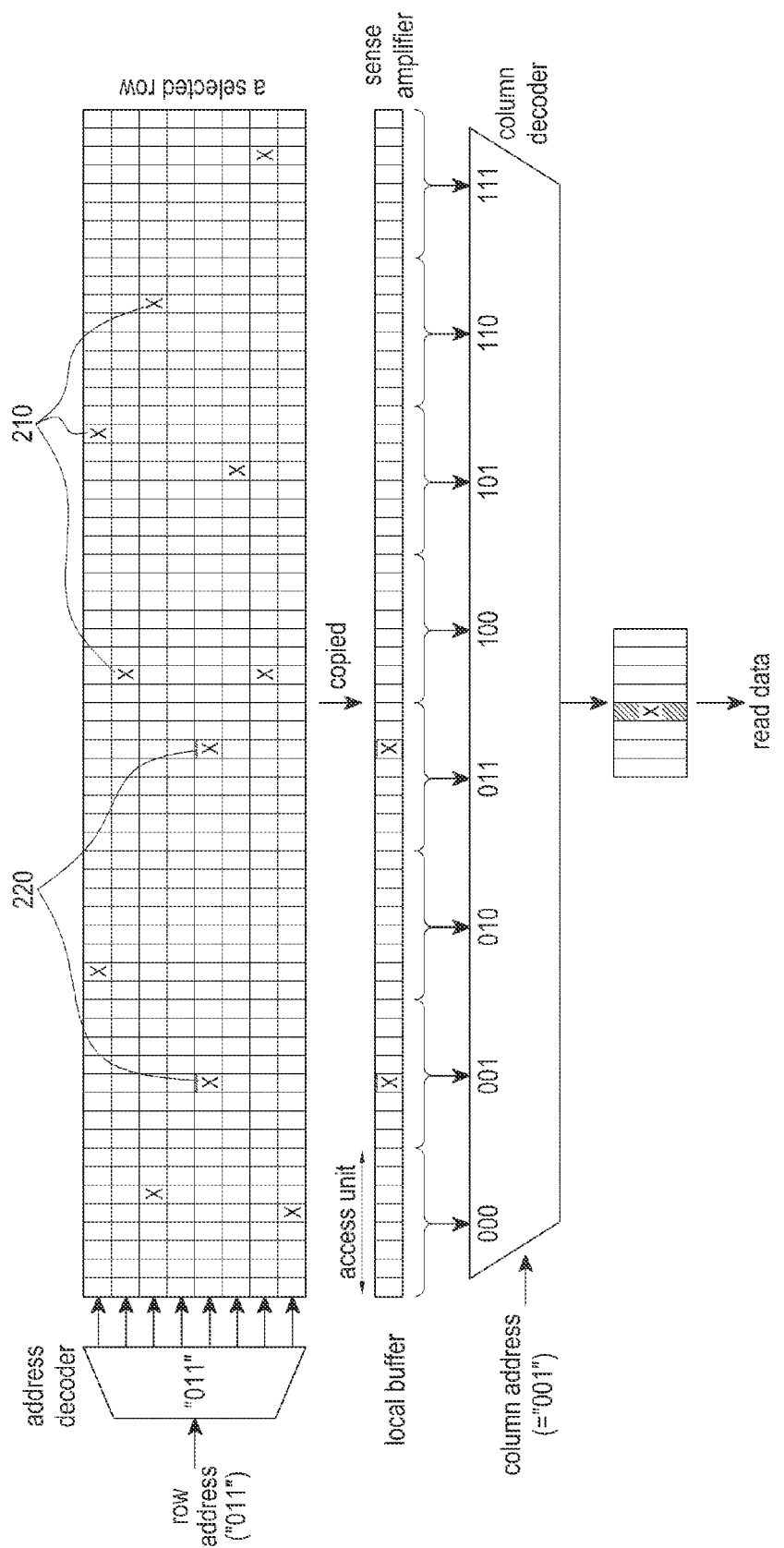
FIG. 2 is a view illustrating a configuration of a memory according to the related art.

FIG. 2 is a view illustrating a configuration of a memory according to the related art.

Referring now to FIG. 2, there is an example of a scheme for reading data in the memory according to the related art. A row (for example, row address "011") is selected by a row address, and the selected value is amplified by means of a sense amplifier (not shown). As a result, a row data is duplicated (or read) to a local buffer. In this description, duplicating data from memory and reading data from memory have an identical meaning, and will be written interchangeably.

Then, an access unit is selected and output, which corresponds to "001" bit according to a column address (for example, column address "001"). In FIG. 2, a bit 210 marked by "x" refers to a 'low-voltage error', and a bit 220 marked by a hatched "x" means a 'low-voltage error' generated at a row "011".

Figure 3:
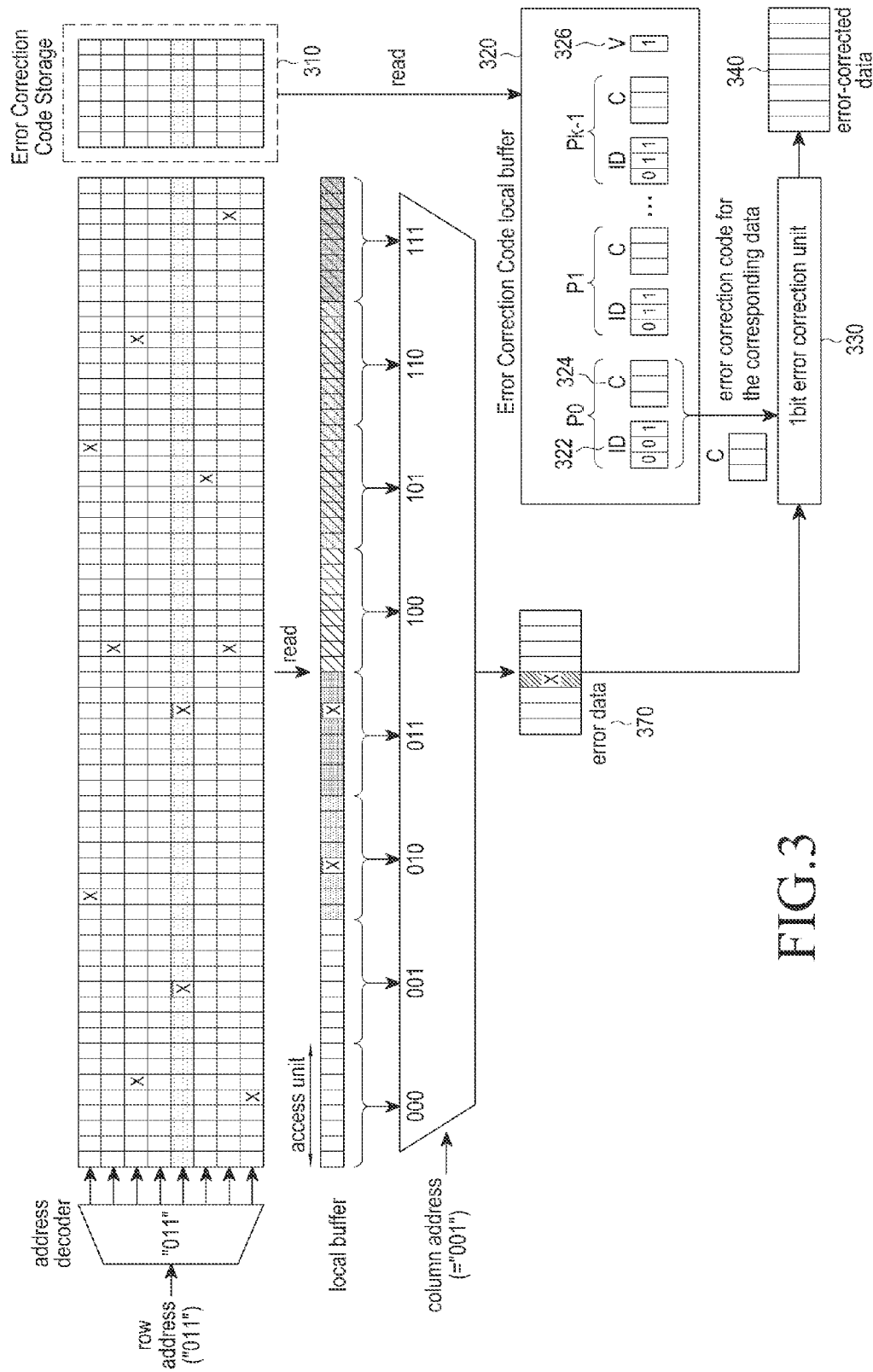
FIG. 3 is a view illustrating a configuration of a memory according to a first exemplary embodiment of the present invention.

FIG. 3 is a view illustrating a configuration of a memory according to a first exemplary embodiment of the present invention.

The first exemplary embodiment of the present invention provides a method of controlling the memory when an error is generated in an identical access unit data.

Referring now to FIG. 3, an exemplary embodiment of the present invention includes an Error Correction Code Storage (hereinafter, referred to as ECCS) 310, an Error Correction Code local buffer (hereinafter, referred to as ECC local buffer) 320, a 1-bit Error Correction Unit (hereinafter, referred to as ECU) 330, and the like additionally, as well as structural elements of the related-art memory that were shown in FIG. 2.

The ECCS 310 has a number k of protection sets stored at each row therein, and the respective protection sets include an IDentifier (ID) bit 332 which stores an error location in a corresponding row and a 'C' bit 324 which is an ECC to correct the corresponding error. It is possible to correct errors up to the number of k, which are able to be generated at each row, by using the 'ID' bit 322 and the 'C' bit 324. The more a constant 'k' increases, the more necessary protection sets are. Therefore, an overhead of an area increases. Accordingly, it is appropriate that the constant 'k' equals to 1 or 2.

Further, the ECCS 310 includes a valid bit 'V' 326 of a 1-bit for each row. For example, the valid bit 'V' 326 is set to '0' if there is no error in a corresponding row, and set to '1' if there is at least one error in the corresponding row. Therefore, the valid bit 'V' can be firstly identified, thereby omitting generally unnecessary operations of attempting to locate errors in a row in which none exist. If there are only a number m of errors fewer than the k number of errors in the corresponding row, the location of the 'mth' last error is duplicated and stored at the ID bit 322 in the (k-m) number of protection sets. Instead of the aforementioned process, when the ID bit 322 is set to '0' and initialized, it can be misrecognized that an error is generated at the '0th' bit.

The ECU 330 includes a 1-bit Error Correction Unit which receives and corrects data 370 which is read from a memory and has an error, and the ECC which is read from the ECCS 310 through the ECC local buffer 320. That is, the ECU 330 may correct a 1-bit error using the ECC. There are many kinds of ECC algorithms known at present, but exemplary embodiments of the present invention are not limited thereto.

Figure 4:
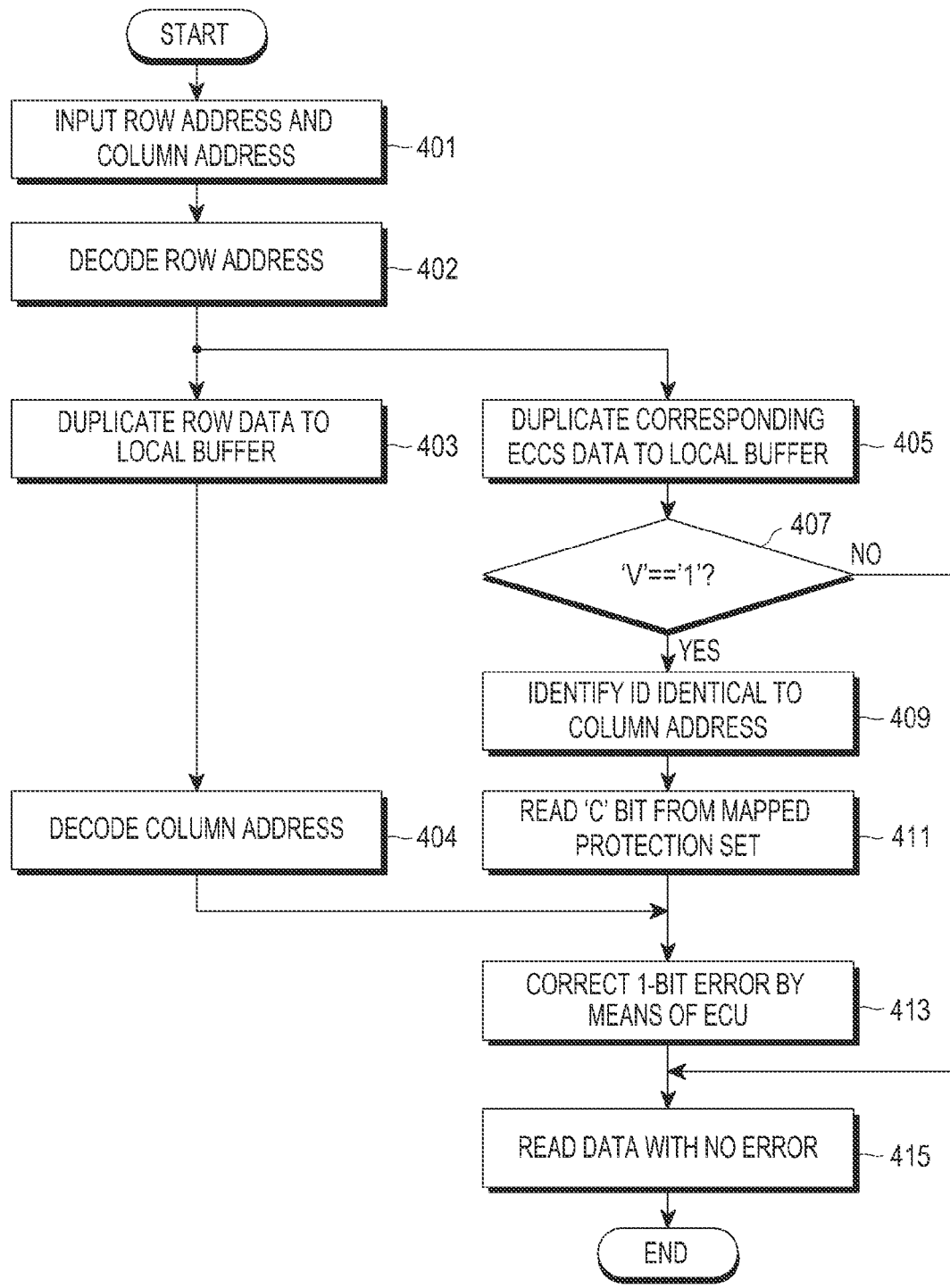
FIG. 4 is a flowchart illustrating a reading operation according to the first exemplary embodiment of the present invention.

FIG. 4 is a flowchart illustrating a reading operation according to the first exemplary embodiment of the present invention.

Referring to FIG. 4, a controller (not shown) identifies that a row address and a column address are input, in step 401, and decodes the row address in step 402. Then, the controller duplicates the row data, which is decoded by a sense amplifier, to the local buffer in step 403. The controller decodes a column address of an access unit to be read in step 404. As a result of the decoding, an access unit is selected and output by a column address. For example, it is assumed that a 1-bit error exists in a "001" bit, as shown in FIG. 3.

The controller duplicates the ECCS data stored in the ECCS 310 to the ECCS local buffer 320 in step 405, simultaneously with step 403. At this time, the row data at step 403 is identical to the row address at step 405.

The controller checks whether the valid bit 'V' 326 stored in the ECCS local buffer 320 is set to '1', in step 407. If the valid bit 'V' 326 is not set to '1', the controller determines that an error does not exist in the corresponding row, and proceeds to step 415 so as to read the data without an error. However, if it is determined that the valid bit 'V' 326 is set to '1' in step 407, the controller determines that at least one error exists in the corresponding row in step 409, and determines whether the 'ID' bit 322 identical to the column address which is read at step 409 exists. The 'ID' bit 322 is the 'ID' bit of the protection sets stored in the ECCS local buffer 320. If the identical 'ID' bit 322 exists, the controller reads the corresponding 'ID' bit 322 and a mapped 'C' bit 324 in step 411.

The controller proceeds to step 413, and corrects data which is read from the memory and has an error, by using the ECC read from the ECC local buffer 320, in step 411. Since the error is corrected as described above, the controller reads the data in which the error has been corrected, in step 415.

Figure 5:
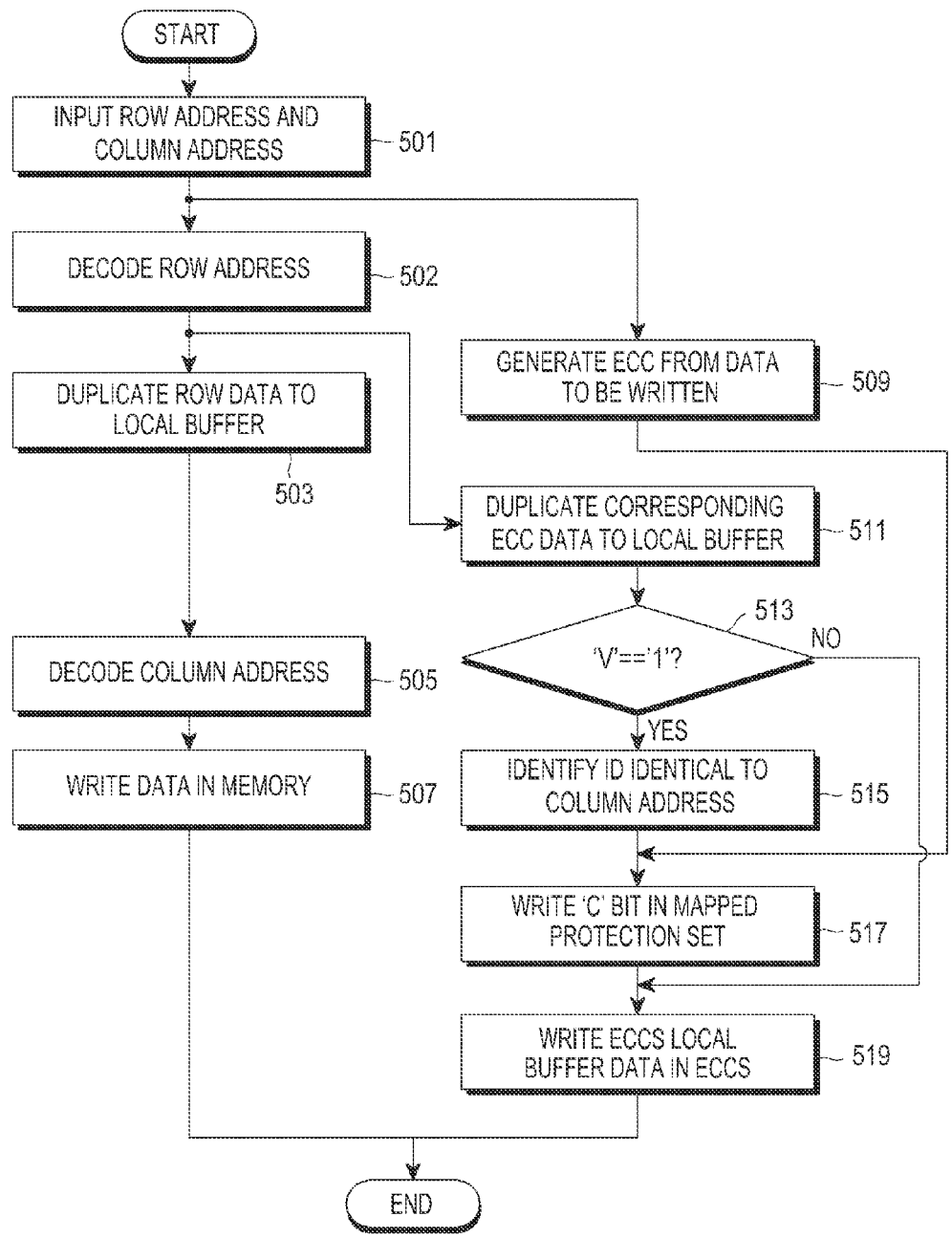
FIG. 5 is a flowchart illustrating a writing operation according to the first exemplary embodiment of the present invention.

FIG. 5 is a flowchart illustrating a writing operation according to the first exemplary embodiment of the present invention.

The writing operation according to the first exemplary embodiment of the present invention is an inverse operation of the reading shown in FIG. 4.

Referring to FIG. 5, the controller identifies that a row address and a column address are input, in step 501, and decodes the row address in step 502. At the same time as the step 502 is performed, the controller carries out step 509, if necessary, in order to generate an ECC from data to be written. When the ECC is generated, the controller writes a generated 'C' bit 324 in a mapped protection set in step 517 and proceeds to step 519 so as to write data of the ECC local buffer 320 in the ECCS 310.

After the step 502, the controller duplicates the decoded row data to the local buffer through the sense amplifier in step 503. Then, the controller decodes the column address in step 505, and writes the generated data resulted from the decoding in the memory in step 507.

The controller duplicates the corresponding ECCS data to the ECCS local buffer in step 511 at the same time of performing the step 503. The ECCS data means the data stored in the ECCS 310, and the row data at the step 503 is identical to the row address at the step 509.

The controller determines whether the valid bit 'V' 326 stored in the ECCS local buffer 320 is set to '1', in step 513. If the valid bit 'V' 326 is not set to '1', the controller determines that no error exists in the corresponding row, and proceeds to step 519 so as to write the data of the ECCS local buffer 320, which has no error, in the ECCS 310.

However, where the valid bit 'V' 326 is set to '1' in step 513, the controller determines that at least one error exists in the corresponding row, and in step 515 outputs the corresponding row from the column decoder. Then, the controller identifies whether an 'ID' bit 322 identical to the column address with an error bit exists. That is, the controller compares the column address output from the column decoder with the 'ID' bit 322 of each protection set of the ECCS. The 'ID' bit 322 is an 'ID' bit of the protection set stored in the ECCS local buffer 320. Where the identical 'ID' bit 322 exists, the controller writes the 'ID' bit 322 and a mapped 'C' bit 324 in the protection set in step 517.

The controller proceeds to step 519, and writes the data of the ECC local buffer 320 in the ECCS 310.

Figure 6:
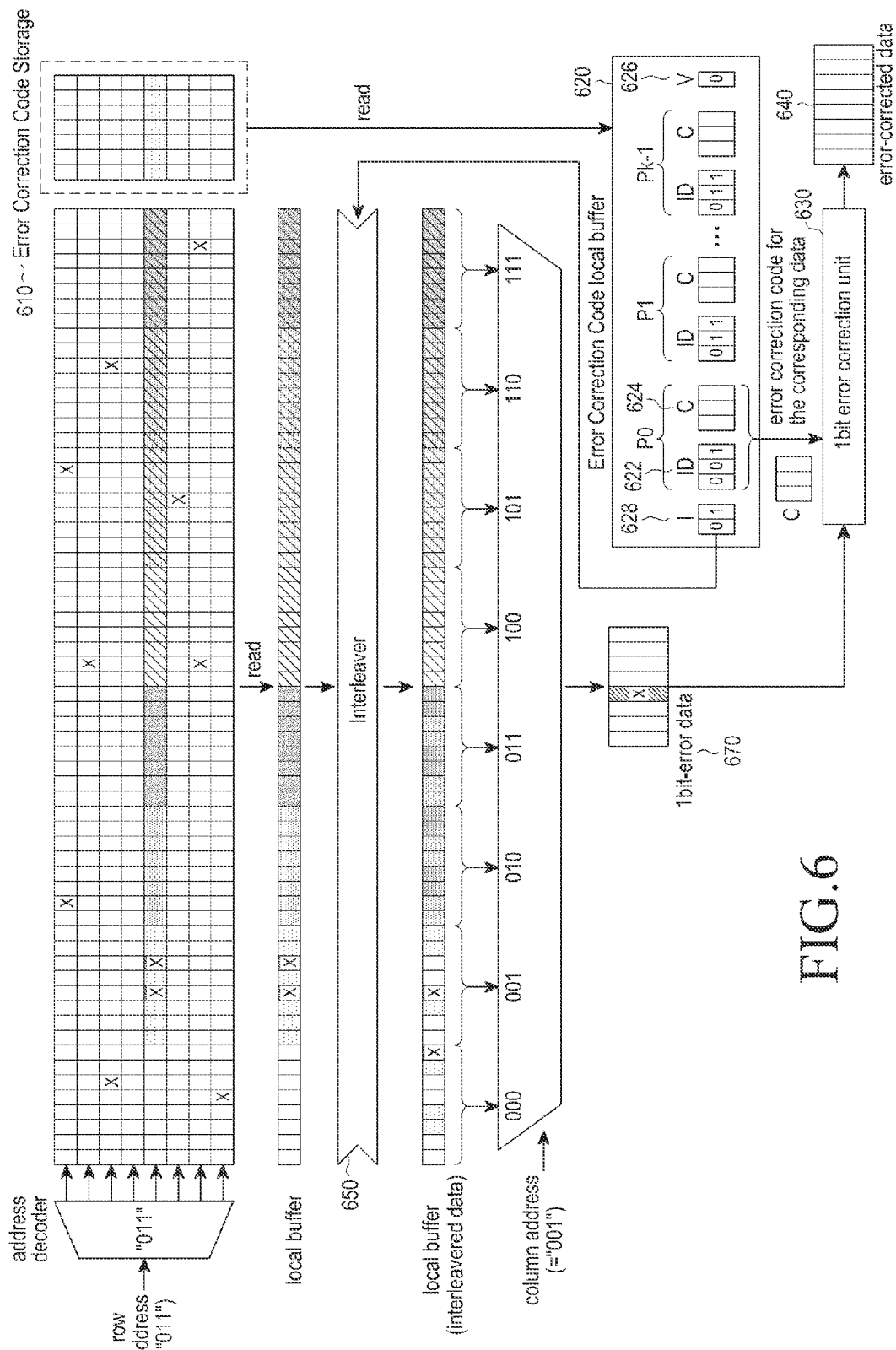
FIG. 6 is a view illustrating a configuration of a memory according to a second exemplary embodiment of the present invention.

FIG. 6 is a view illustrating a configuration of a memory according to a second exemplary embodiment of the present invention.

The second exemplary embodiment of the present invention provides a method of controlling the memory where two errors are generated in an identical access unit data. To control the memory, the second exemplary embodiment of the present invention additionally includes an interleaver 650. Further, the second exemplary embodiment of the present invention includes 'I' bit 628 to control the interleaver 650. In FIG. 3 showing the configuration of the memory, where two errors are generated in the data of the identical access unit, it is impossible to correct both errors by means of the 1-bit ECU. In order to address this problem, an exemplary embodiment of the present invention additionally includes the interleaver 650 and disperses a location of the errors. As the interleaver changes an order of signals to be input and disperses the location of the errors, a decoder can effectively correct the errors.

The interleaving scheme can be performed in different manners, and it can be differently set at each row by the 'I' bit 628. A value of the 'I' bit 628 is determined by identifying the accurate location of the errors in a calibration process and selecting an appropriate interleaving scheme to disperse the location of the errors, after a chip is manufactured. If the 'I' bit 628 is defined as 2-bits, for example, four interleaving schemes can be employed. The exemplary embodiments of the present invention do not limit the respective interleaving schemes.

ECCS 610, ECC local buffer 620, ID 622, C 624, 'V' bit 626, error correction unit 630, error-corrected data 640, and 1 bit error data 670 are essentially similar to the corresponding elements of FIG. 3, and a detailed description thereof is omitted herein.

Figure 7:
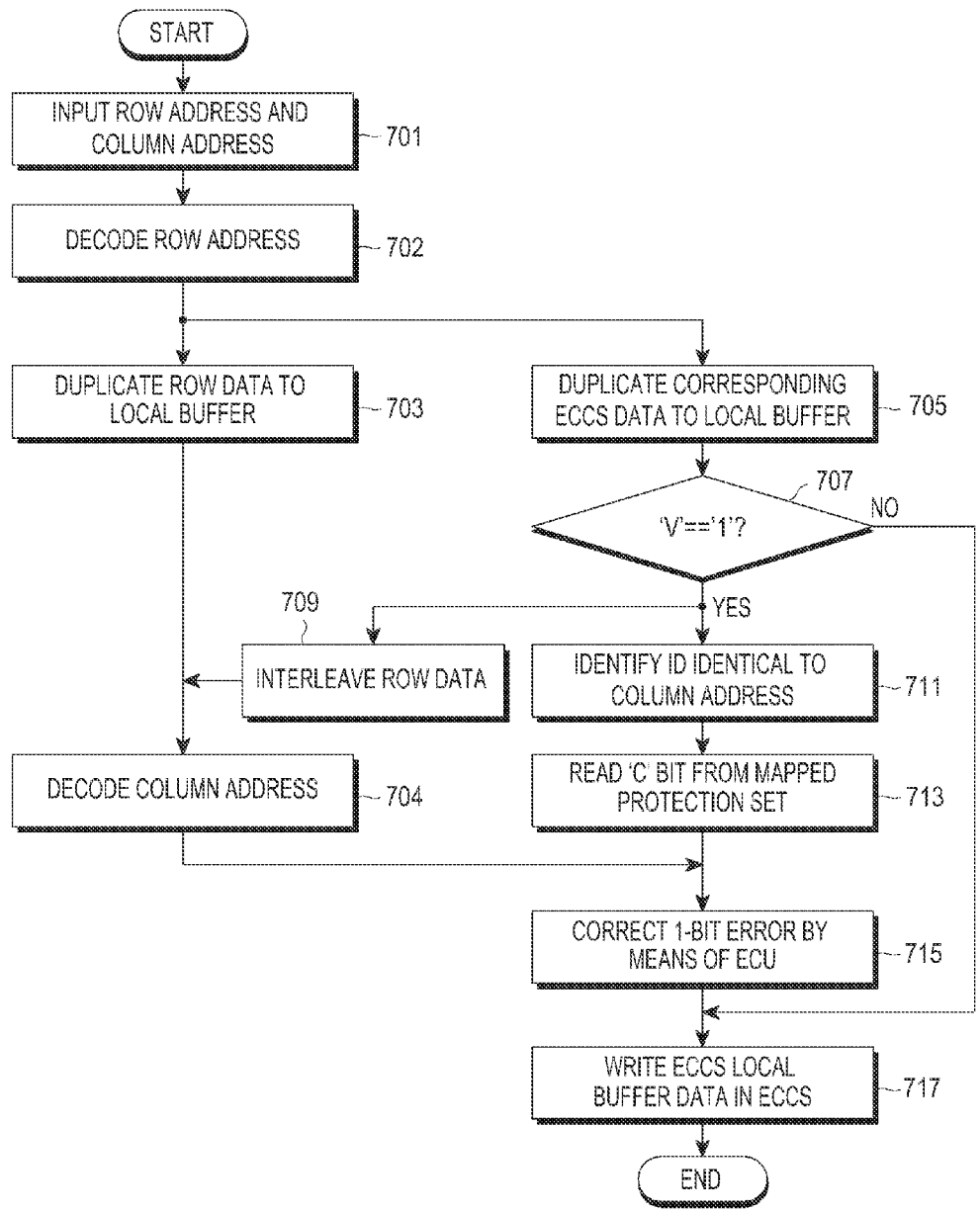
FIG. 7 is a flowchart illustrating a reading operation according to the second exemplary embodiment of the present invention.

FIG. 7 is a flowchart illustrating a reading operation according to the second exemplary embodiment of the present invention.

Referring now to FIG. 7, the controller identifies that a row address and a column address are input in step 701, and decodes the row address in step 702. Then, the controller duplicates the decoded row data to a local buffer through a sense amplifier in step 703. Further, the controller decodes the column address in step 704. As a result of the decoding, an access unit is selected and output by the input column address. For example, it is assumed that 1 error bit exists in a "001" bit, as shown in FIG. 3.

The controller duplicates an ECCS data stored in an ECCS 610 to a local buffer 620 in step 705, at the same time as it performs the step 703. The row data of the step 703 is identical to the row address of the step 705.

The controller determines whether a valid bit 'V' 626 stored in the ECCS local buffer 620 is set to '1' in step 707. If the valid bit 'V' 626 is not set to '1', the controller determines that the corresponding row has no error, and proceeds to step 717 so as to read the data with no error.

However, where it is determined that the valid bit 'V' 626 is set to '1' in step 707, the controller determines that the corresponding row has at least one error, and carries out two processes simultaneously as follows.

Firstly, the controller determines whether an 'ID' bit 622 which is identical to the column address read in step 701 exists, in step 711. The 'ID' bit 622 is an 'ID' bit of a protection set stored in the ECCS local buffer 620. Where the identical 'ID' 622 exists, the controller reads a 'C' bit 624 from the protection set in which the 'ID' bit 622 is mapped in step 713.

Secondly, the controller controls the interleaver 650 using the 'I' bit 628 set in the ECCS local buffer 620 and inputs an interleaved data to the local buffer through the interleaver 650, in step 709. Then, the controller proceeds to step 704 and decodes the column address.

After carrying out the steps 713 and 704, the controller proceeds to step 715 so as to correct data 670 which is read from the memory and has an error by using an ECC read from the ECC local buffer 620. Therefore, as the error is corrected, the controller reads the data in which the error has been corrected in step 717.

Figure 8:
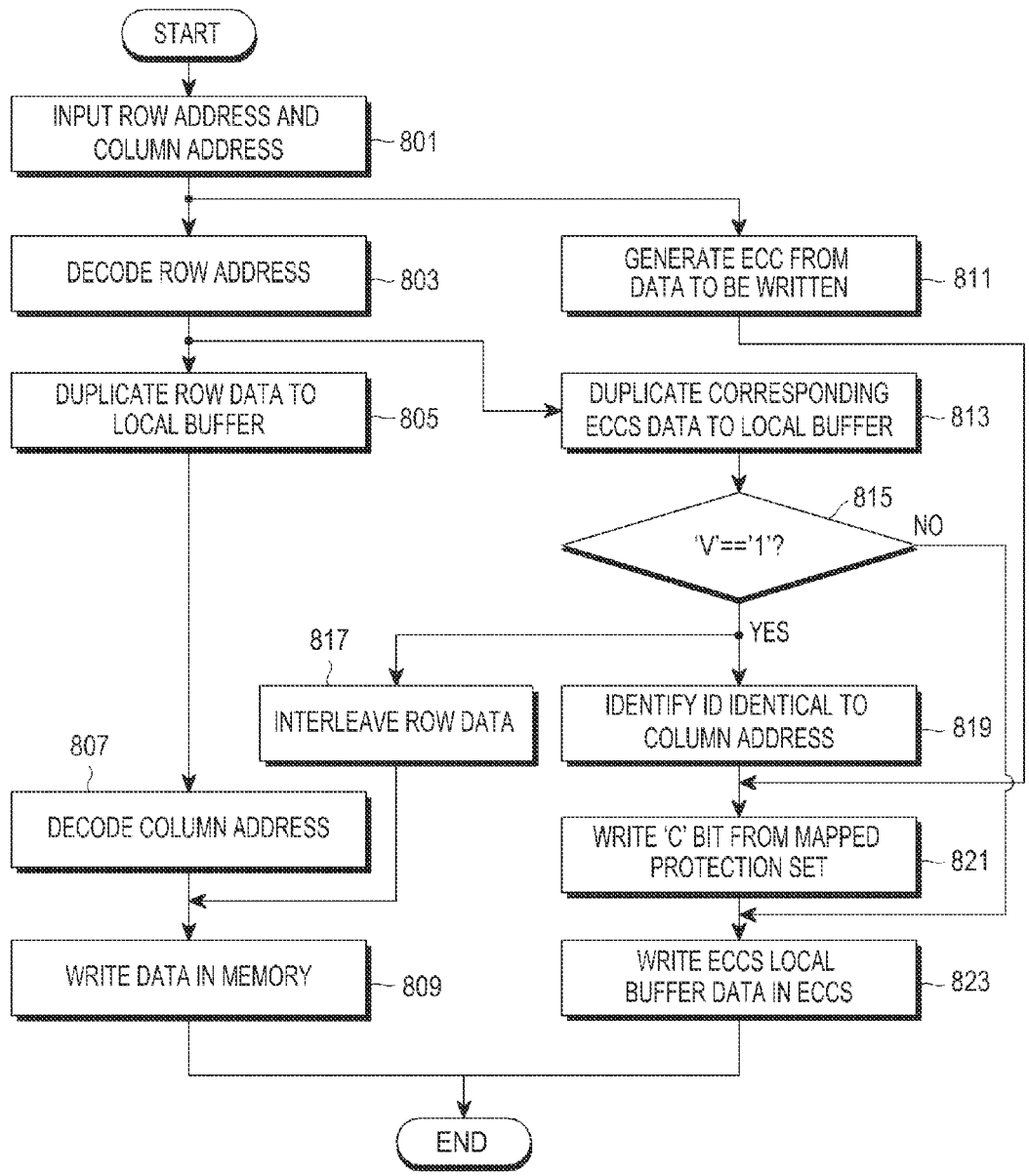
FIG. 8 is a flowchart illustrating a writing operation according to the second exemplary embodiment of the present invention.

FIG. 8 is a flowchart illustrating a writing operation according to the second exemplary embodiment of the present invention.

The writing operation according to the second exemplary embodiment of the present invention is an inverse operation of the reading shown in FIG. 7.

Referring to FIG. 8, the controller (not shown) recognizes that a row address and a column address are input in step 801. The row address and the column address are input to access a memory. Then, the controller decodes a row data in step 803. At the same time as the step 803 is performed, the controller generates an ECC from data to be written, if necessary, in step 811. When the ECC is generated, the controller writes the generated 'C' bit 624 in a mapped protection set, in step 821, and proceeds to step 823 in order to write the data of the ECC local buffer 620 in the ECCS 610.

On the other hand, after the step 803, the controller duplicates the row data to the local buffer through a sense amplifier in step 805. Then, the controller decodes the column address in step 807, and writes the data which is generated as a result of decoding in the memory in step 809.

At the same time as the step 805 is performed, the controller duplicates the corresponding ECCS data to the ECCS local buffer in step 813. The row data of the step 805 is an identical address to the row address of the step 813.

The controller determines whether the valid bit 'V' 626 stored in the ECCS local buffer is set to '1' in step 815. If the valid bit 'V' 626 is not set to '1', the controller determines that the corresponding row has no error and proceeds to step 823 so as to write the ECCS local buffer data with no error in the ECCS.

However, if the valid bit 'V' 626 is set to '1' in step 707, the controller determines that the corresponding row has at least one error and performs two steps simultaneously as follows.

Firstly, the controller controls the interleaver 650 by means of the 'I' bit 628 set in the ECCS local buffer 620 and inputs the data, which is interleaved by means of the interleaver 650, in the local buffer in step 817. Then, the controller proceeds to step 809 so as to write the data in the memory.

Secondly, the controller determines that the corresponding row has at least one error and identifies whether the 'ID' bit 622 which is identical to the column address output from a column decoder, in step 819. That is, the controller compares the column address output from the column decoder with the 'ID' bit 622 of each protection set in the ECCS. The 'ID' bit 622 is an 'ID' bit of the protection set stored in the ECCS local buffer 320. Where the identical 'ID' bit 622 exists, the controller writes the 'ID' bit 622 and the mapped 'C' bit 624 in the protection set in step 821.

The controller proceeds to step 823, and writes the data of the ECC local buffer 620 in the ECCS 610.

The exemplary embodiments of the present invention address a problem of the related-art design technique in which a voltage of an electric power source is lowered to a level at which an error may be generated in order to improve an efficiency of electric power in a memory for use in most digital processors and systems and thereby causes a memory error to be generated. Accordingly, the exemplary embodiments of the present invention can maximize the efficiency of the electric power while minimizing an area cost to be added and a performance penalty.

In the exemplary embodiments of the present invention, the added area cost is for a memory space in which the ECCS is stored and an interleaving logic. The exemplary embodiments of the present invention can minimize the area cost by providing an ID bit, and selecting and storing only the ECC of a location at which an error is generated, differently from the related art in which only an ECC for the entire data is stored. Further, the exemplary embodiments of the present invention can process multi-bit errors, which may be generated in a memory row, by means of only a 1-bit error correction unit.

It is thus possible to greatly reduce a consumption of electric power of a mobile communication system through the exemplary embodiments of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for controlling a memory in a mobile communication system, the apparatus comprising:
   the memory for storing data including at least one error caused by a low-voltage; and
   an error correction unit for identifying whether the at least one error exists in the memory according to a first bit set in a local buffer of an error correction code storage, for comparing location information on the error data read from the memory with location information on error data of at least one protection set in the local buffer of the error correction code storage if it is determined that the at least one error exists in the memory, for generating an error correction code as a result of the comparison, and for correcting the error data of the memory according to the error correction code.

2. The apparatus of claim 1, wherein the error correction code storage comprises at least one protection set in each row, in which the at least one protection set includes an identifier (ID) bit for indicating a location of the error data and the error correction code.

3. The apparatus of claim 2, wherein the error correction unit compares a column address on the error data read from the memory with the ID bit of the at least one protection set, and generates the error correction code from a corresponding protection set if a matched protection set exists.

4. The apparatus of claim 1, further comprising an interleaver for interleaving each row of data of the memory according to a second bit stored in the local buffer of the error correction code storage if the error bit read from the memory is two-bits.

5. The apparatus of claim 4, wherein the second bit disperses the error of two-bits read from the memory by means of the interleaver.

6. The apparatus of claim 1, wherein the error correction unit corrects an error of one-bit in the error correcting.

7. A method of controlling a memory in a mobile communication system, the method comprising:
  identifying whether information of at least one error caused by a low-voltage exists in the memory for storing error data according to a first bit set in a local buffer of an error correction code storage;
  comparing location information on the error data read from the memory with location information on error data of at least one protection set in the local buffer of the error correction code storage if it is determined that the at least one error exists in the memory; and
  generating an error correction code as a result of the comparison and correcting the error data of the memory according to the error correction code.

8. The method of claim 7, wherein the at least one protection set comprises an identifier (ID) bit which indicates a location of the error data and the error correction code.

9. The method of claim 8, wherein the comparing comprises:
  comparing a column address on the error data read from the memory with the ID bit of the at least one protection set; and
  generating the error correction code from a corresponding protection set if a protection set matched with the ID bit exists as a result of the comparison.

10. The method of claim 7, further comprising:
  interleaving each row of data of the memory according to a second bit stored in the local buffer of the error correction code storage if the error bit read from the memory is two-bits.

11. The method of claim 10, wherein the second bit disperses the error of two-bits read from the memory by means of the interleaver.

12. The method of claim 7, wherein an error of one-bit is corrected in the error correcting.

13. An apparatus for controlling a memory in a mobile communication system, the apparatus comprising:
  a memory in which error data caused by a low-voltage is stored;
  an error correction code storage for storing at least one protection set corresponding to a row address to be recorded if a signal is input;
  a controller for identifying whether at least one error exists in the memory according to a first bit stored in a local buffer of the error correction code storage, for, if it is determined that the at least one error exists in the memory, comparing a column address on the error data read from the memory with an identifier (ID) bit of the at least one protection set, and for generating an error correction code as a result of the comparison; and
  an error correction unit for correcting the error data of the memory according to the error correction code.

14. The apparatus of claim 13, wherein the at least one protection set comprises the ID bit which indicates a location of the error data and the error correction code.

15. The apparatus of claim 14, wherein the controller compares a column address on the error data read from the memory with the ID bit of at least one protection set, and generates the error correction code from a corresponding protection set if a matched protection set exists.

16. The apparatus of claim 13, further comprising an interleaver for interleaving each row of data of the memory according to a second bit stored in the local buffer of the error correction code storage if the error bit read from the memory is two-bits.

17. The apparatus of claim 16, wherein the interleaver disperses the error of two-bits read from the memory according to the second bit.

18. The apparatus of claim 13, wherein the error correction unit corrects an error of one-bit in the error correcting.

19. A method of controlling a memory in a mobile communication system, the method comprising:
  storing at least one protection set, which corresponds to a row address to be recorded, in an error correction code storage, if a signal is input;
  identifying whether information of at least one error data caused by a low-voltage exists in the memory, according to a first bit stored in a local buffer of the error correction code storage;
  comparing, if the at least one error exists in the memory, a column address on the error data read from the memory with an identifier (ID) bit of at least one protection set;
  generating an error correction code as a result of the comparison; and
  correcting the error data of the memory according to the error correction code.

20. The method of claim 19, wherein the at least one protection set comprises an ID bit which indicates a location of the error data and the error correction code.

21. The method of claim 20, wherein the comparing comprises:
  comparing the column address on the error data read from the memory with the ID bit of at the least one protection set; and
  generating the error correction code from a corresponding protection set if a protection set matched with the ID bit exists as a result of the comparison.

22. The method of claim 19, further comprising interleaving each row of data of the memory according to a second bit stored in the local buffer of the error correction code storage if the error bit read from the memory is two-bits.

23. The method of claim 22, wherein the interleaver disperses the error of two-bits read from the memory according to the second bit.

24. The method of claim 19, wherein an error of one-bit is corrected in the error correcting.

* * * * *